Oct. 19, 1948.　　　　　　　S. A. BOBE　　　　　2,451,909
SERIES GENERATOR-FED MOTOR SYSTEM
Filed April 3, 1945
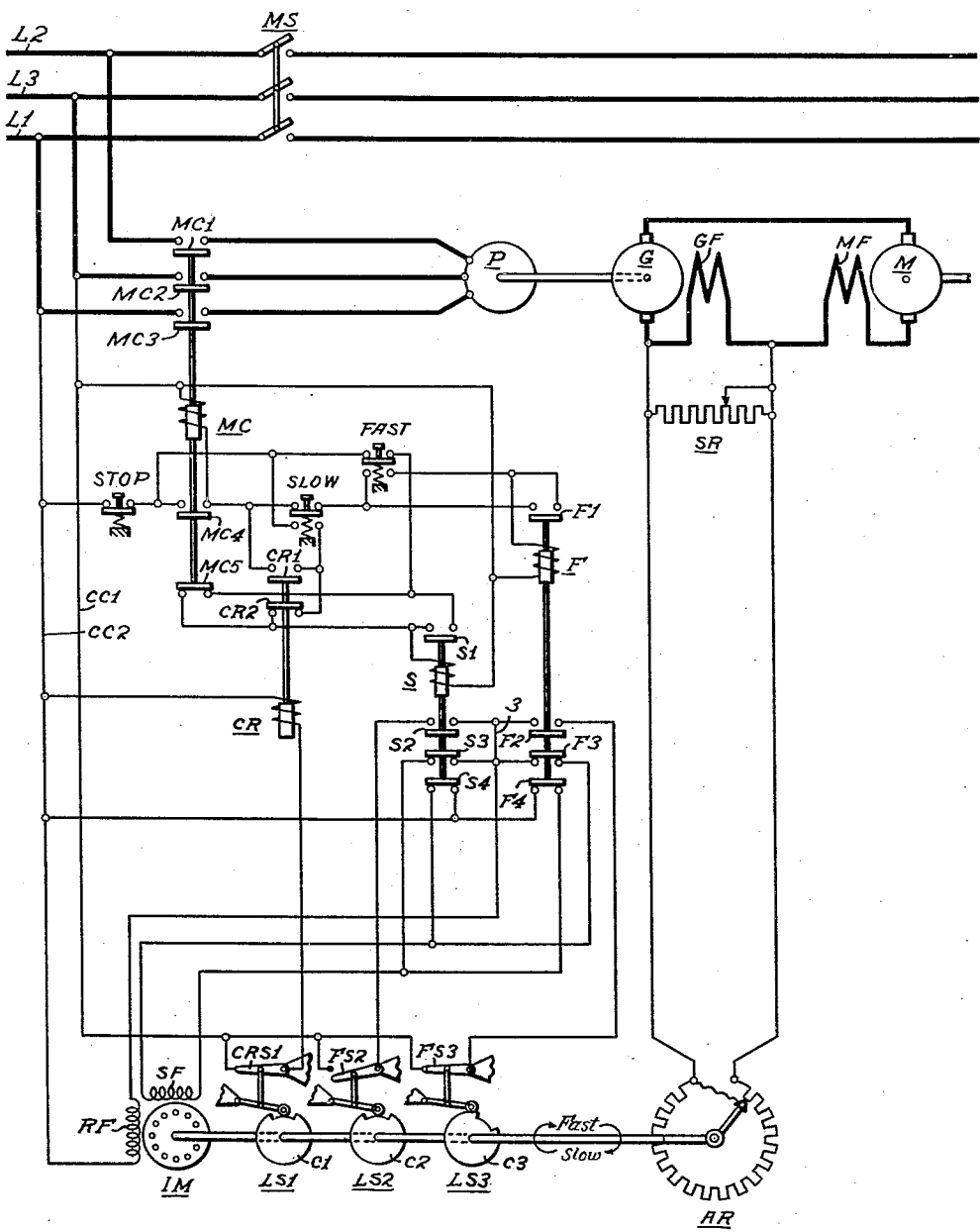
WITNESSES:
Edward Michaels
E. H. Oberhein
INVENTOR
Stanley A. Bobe.
BY
Paul E. Friedemann
ATTORNEY Patented Oct. 19, 1948

2,451,909

UNITED STATES PATENT OFFICE 2,451,909

SERIES GENERATOR-FED MOTOR SYSTEM

Stanley A. Bobe, Atlanta, Ga., assignor to Westinghouse Electric Corporation, East Pittsburgh, Pa., a corporation of Pennsylvania Application April 3, 1945, Serial No. 586,391

4 Claims. (Cl. 318—158)

This invention relates, generally, to electric drives embodying a motor as the element to be controlled and more particularly to electric drives of the type embodying a series connected generator for energizing a motor to be controlled.

The electric drive, hereinafter disclosed, embodies a simple and effective control of the excitation of the generator series field and to this end, provides means for controlling the maximum excitation of the generator field and means for providing a variation in excitation thereof over a uniformly variable range to effect smooth acceleration and deceleration of the motor within the speed range determined by the setting of the maximum excitation control. The accelerating control is more or less independent of the load driven by the motor, however, the speed control is not necessarily so. For example, if a motor as shown in the drawing were driving a mechanism through which a moist paper web or a web of another material were passing which had heat applied along a portion of its length to dry the web, the speed control would then be automatically regulated in response to the output of some means responsive to the moisture content in the web beyond the heated area. If the web were too moist, the speed control would be set for a lower value to lengthen the drying period of each element of the web. The converse would be true if the web beyond this heated area were dry. The speed would thus be set at some optimum value depending upon the moisture responsive element. Such application is but one of many and is mentioned in passing that it may not be construed that the speed control is necessarily limited to manual operation or for that matter, any one of the numerous known controls but may be considered in a more general nature.

An important object of this invention is to provide an electric drive of the character mentioned which is simple in construction and effective in operation.

Another object of this invention is to provide an electric drive of the character referred to which embodies simple and effective speed control.

Another object of this invention is to provide an electric drive embodying simple and effective acceleration control.

Another object of this invention is to provide an electric drive embodying simple and effective acceleration control which control operates over a complete cycle for a complete cycle of motor operation and, hence, is always set to initiate or control a new cycle of operation of the motor.

Other objects and advantages will become apparent from a study of the following disclosure when considered in conjunction with the accompanying drawing, in which the single figure thereof illustrates schematically an electric drive embodying the principles of this invention.

The electric drive shown in the drawing includes a series connected series motor and generator, respectively, designated M and G. The motor is provided with a series field winding MF and the generator is provided with a series field winding GF. A prime mover P is connected directly to the generator G. As is well known, a generator of the type illustrated depends upon its residual magnetism for producing an electrical output, thus, an electrical quantity does not appear at the output terminals of the generator until the prime mover P is operated. Energization of the prime mover P is controlled by a main contactor MC which has its contact members MC1, MC2 and MC3 each connected in the three supply circuits for the prime mover P which, in turn, are connected to the conductors L1, L2 and L3 extending from a suitable main source of electrical energy. A main switch, such as MS, connects the conductors L1, L2 and L3 to the main energizing source. Speed control of the motor is obtained by means of a speed regulating rheostat SR which is connected in parallel with the generator series field winding GF. The accelerating rheostat AR is automatically controlled by means of a single phase induction motor IM which is provided with starting and running field windings, respectively, designated SF and RF. The squirrel cage type rotor of the induction motor has connected along its output shaft a group of cams designated C1, C2 and C3, respectively, forming parts of the limit switches generally designated LS1, LS2 and LS3. The motor shaft extends beyond the cam assembly to have fastened at its extremity a radially extending arm which carries at its extremity a contact element which slidably engages the arcuately formed accelerating rheostat. This sliding contact is connected by means of a flexible conductor to one terminal of the accelerating rheostat. Thus in the position shown, the accelerating rheostat slider is in a position in which substantially all of the rheostat is shunted from the parallel circuit, thus, a very low parallel resistance path around the generator series field GF is formed and a large percentage of the current flowing in the series generator circuit will be shunted around the generator field; thus, its excitation will be at some low value and its electrical output a correspondingly low value.

Operation of the single-phase induction motor IM, in either of its two directions of rotation, is obtained depending upon the direction of the magnetic fluxes produced by the starting and running field windings thereof, respectively designated SF and RF. These field windings are each connected in what may be considered parallel circuits extending between the two control conductors designated CC1 and CC2 which are supplied from the main lines L1 and L3. One of the parallel branches may be traced from the conductor CC1, through the field switch FS2 which is actuated by the cam C2 and is now in the open position, through a contact S2 of the slow speed relay S and then through the running field winding RF to the conductor CC2. A second parallel circuit may be traced from the control conductor CC1, through the field switch FS3, through the contacts S2, the contacts F3, the starting field winding SF, the contacts F4 and thence to the conductor CC2. These parallel field circuits are tied together by means of the conductor 3. The contact members S3 are connected from one side of the starting field SF in one of the parallel circuits to an opposite side of the running field winding RF in the other parallel circuit. The contact members S4 are connected between the two remaining extremities of the starting and running field windings. Provision is made at the Slow and Fast push buttons for alternately operating the slow and fast relays S and F. The circuit arrangement thus described, dependent upon the position of the field switches FS2 and FS3, provides a convenient means for reversing the excitation of the motor field SF with respect to RF to effect reversing of the induction motor. During starting when the slow relay S is energized the field switch FS2 is opened thus the motor M is started and brought up to a low or creeping speed with the generator field at some low excitation. Pressing the Fast button drops out the slow relay S and energizes the fast relay F. This energizes the induction motor fields RF and SF in a direction to drive the accelerating rheostat slider to a position in which a substantial portion of the accelerating rheostat AR is in the shunt circuit and at the same time closes the switch FS2 and opens the switch FS3 to deenergize the motor fields RF and SF at the limit of the slider movement. Switch CRS1 is now also open and as a consequence relay CR drops out. To go from fast to slow operation of the motor, the Slow push button is now pressed, energizing the S relay and deenergizing the F relay. The circuit for relay F across conductors CC1 and CC2 when relay F is energized includes the Stop push button, the Slow push button and the holding contacts F1. Thus when the Slow push button is pressed, the coil of relay F is deenergized. When the Slow push button is pressed, an energizing circuit for the slow relay S is completed from conductor CC1, the coil of relay S, the now closed contacts CR2, the now closed contacts of the Slow push button, through the Stop push button to the conductor CC2. Since the switch FS2 is now closed the motor field SF is reversely energized to reverse the induction motor and return to the slider of the accelerating rheostat to the position illustrated. Thus it will be apparent that the reversing connections for the induction motor fields are set up by the relays S and F and the reversing cycle of the motor is controlled by means of the field switches FS2 and FS3 in turn controlled by the cams C2 and C3, the arrangement being such that during starting of the motor, when the slow speed relay is energized, the field switch FS2 is in the opened position as shown. Thus, though the contact members S2 are closed and the contact members F3 and F4 are closed to establish an energizing circuit for the starting and running field windings for the motor, the complete energizing circuit for these motor fields is open at the switch FS2. Thus, the accelerating rheostat remains in what may be termed, its resistance all out position as shown, and as a consequence the excitation of the generator series field is some low value.

To energize the starting and running field windings of the induction motor and so operate the accelerating rheostat AR to accelerate the motor, it is necessary to energize the fast relay F which closes its contact members F2 and opens its contact members F3 and F4. When the fast relay is energized, the slow relay is deenergized as will hereinafter become apparent from the more detailed description appearing in the description concerning the operation of the system and as a consequence the contact members S3 and S4 are closed. Thus, an energizing circuit for the running field windings is completed from the conductor CC1, the field switch FS3, the contacts F2, the conductor 3, through the running field winding to the conductor CC2 and a parallel branch of this circuit including the contacts S3, the starting field winding SF, the contacts S4 energizes the starting field winding. The direction of excitation is now such that the slider on the accelerating rheostat is driven in a direction to insert increasing portions of the rheostat AR in parallel with the generator series field to thus decrease the current flow in the parallel circuit and increase the current flow through the series field. Operation of the rheostat under these conditions continues until the cam C3 has moved through a sufficient angle in the clockwise direction for the roller on the cam to drop into the notch provided in the cam surface. As a result, the field switch FS3 is opened and the motor field windings deenergized. Movement in the clockwise direction of the cam C2 closes the field switch FS2 shortly after the movement in the clockwise direction is initiated. It will now be seen that when the slow relay S is energized and the contact members S2 thereof close an energizing circuit for reversing the excitation of the starting field with respect to the running field winding will be completed. Such an energizing circuit for reversing the excitation of the induction motor includes the contact member F3 and F4 which are closed as a result of the deenergization of the F relay when the S relay is energized, this interlocking control of relays F and S being described in that portion of this description devoted to the operation of the system which is hereinafter given. The reversing for the induction motor excitation may be traced from the conductor CC1, the field switch FS2 now closed, the contacts S2, the conductor 3, the running field winding RF and thence to the conductor CC2. A parallel circuit extending from the conductor 3, the contact members F3, the starting field winding SF, the contact members F4 to the conductor CC2 energizes the starting field winding for the motor. Since the connections thus made for the field windings are reversed, the induction motor rotor operates in the opposite direction and returns the slider of the accelerating rheostat AR to the position shown. When this position is reached, the induction motor fields are deenergized by opening of the field switch FS2 as a result of movement of the cam C2. A cam designated C1 also provided on the motor shaft operates a switch CRS1 which is connected in series with the coil of the control relay CR across the conductors CC1 and CC2.

A better understanding of the system may be had upon a consideration of the function of the various elements during the operation of the system. If the attendant desires to start the motor M, the main switch MS is closed. This energizes the conductors L1, L2 and L3 and supplies electrical energy in the lines as far as the contacts MC1, MC2 and MC3 in the circuit for the prime mover P. The control conductors CC1 and CC2 are also now energized. Thus, the coil of the control relay CR is energized since the switch CRS1 is closed connecting said coil across the conductors CC1 and CC2. This control relay CR picks up and closes its contact members CR1 while, at the same time, opening its contact members CR2. The slow relay S is energized from a circuit which may be traced from the conductor CC2 through the Stop push button, the Fast push button, the contact members MC5 of the main contactor MC yet closed, the coil of the relay S to the conductor CC1. This relay immediately picks up closing its contact members S1 to complete a holding circuit for the coil thereof which is independent of the position of the contact members MC5. The contact members S2, in one energizing circuit for the induction motor starting and running field windings, now close. This, however, does not energize the starting and running field windings since the field switch FS2 is yet open. The contact members S3 and S4 open; however, for this condition of operation the fast relay F remains deenergized, its coil circuit being open at the Fast push button and the F3 and F4 contacts are closed. Since the field switch FS2 is in the open position shown in the drawing, an energizing circuit for the starting and running fields of the induction motor is not completed. Hence, the accelerating rheostat remains in the shunted position shown.

The prime mover is started by pressing the Slow push button. This energizes the coil of the main contactor MC through a circuit across the conductors CC1 and CC2 which includes the Stop push button, the front contacts of the Slow push button and the contacts CR1. As the prime mover comes up to speed, the electrical output of the generator comes up to some substantially low constant value by reason of the small current circulating in the generator series field. As a result, the motor is operated at a low or creeping speed. In order to increase the speed of the motor M, the attendant presses the Fast push button. This opens the back contact members thereof and deenergizes the coil of the slow relay S in the circuit therefor traced in the preceding paragraph allowing this relay to drop out. At the same time, at the front contacts of the Fast push button, an energizing circuit for the coil of the fast relay F is completed. This circuit may be traced from the conductor CC2 through the Stop push button, the contacts MC4, the back contacts of the Slow push button, the front contacts of the Fast push button, the coil of the fast relay F to the conductor CC1. The relay F now picks up and closes its contact members F1 to establish an energizing circuit for the coil thereof which is independent of the position of the Fast push button. The contact members F2 close and the contact members F3 and F4 open. Since the contact members S3, S4 are now closed, an energizing circuit for the starting and running field windings of the induction motor IM is completed. This circuit is traced from the conductor CC1, the field switch FS3, the contacts F2 and the running field winding RF to the conductor CC2. A parallel circuit extends from the conductor 3 through the contacts S3, the starting field winding SF, the contacts S4 to the conductor CC2. The rotor of the induction motor now rotates in a direction to insert the accelerating rheostat in the parallel branch around the generator series field. As a result, the current flow through this parallel branch is decreased and the current flow through the series field winding increased. The generator electrical output correspondingly increases and the motor is accelerated at a rate depending upon the rate of movement of the slider along the accelerating rheostat. The field windings of the induction motor are deenergized when the field switch FS3 is opened by the cam C3. Meanwhile, the cam C2 closes the field switch FS2 to establish a partial energizing circuit for reversely operating the induction motor. Likewise, the cam C1 has opened the switch CRS1 to deenergize the control relay CR which control relay opens its contact members CR1 and closes its contact members CR2. Opening of the contact members CR1 does not deenergize the main contactor MC, because the coil thereof is now energized across the conductors CC1 and CC2 through a holding circuit including the Stop push button, its contact members MC4 now closed and the said coil.

Under the influence of the operation of the accelerating rheostat, the motor speed builds up to a value determined by the setting of the speed rheostat SR. The setting of the speed rheostat SR determines the total parallel resistance in the parallel circuit. Hence, the excitation of the generator field depends upon the setting of the speed rheostat and the speed of the motor may be varied over a wide speed range by increasing or decreasing the resistance of the speed rheostat.

When the attendant desires to bring the motor M to rest, the Stop push button is depressed. This opens the coil of the main contactor MC causing this contactor to drop out. The prime mover P is deenergized at the contacts MC1, MC2 and MC3. As the prime mover comes to rest the generator voltage drops and the motor M stops. The contacts MC4 open the circuit to the coil of the fast relay F which drops out closing its contacts F3 and F4. When the Stop push button is released and its contacts again closed, the slow relay S is connected across the conductors CC1 and CC2 in a circuit including the Stop push button, the back contacts of the Fast push button, the contacts MC5 and the coil of the slow relay. When the contacts S2 close, the running field winding RF is connected across the conductors CC1 and CC2 in a circuit including the contacts S2 and the field switch FS2 now closed. A parallel circuit branch including the contacts F3 and F4 energizes the starting field winding SF. The rotation of the induction motor is now in such a direction to reset the cams and return the slider of the accelerating rheostat AR to the position shown in the drawing at which time the field switch FS2 opens and deenergizes the starting and running field windings, stopping the induction motor. When the control relay switch CRS1 closes, the control relay again picks up and the system is again set for a new starting cycle. If the system is to be started again, the Slow push button may be depressed as previously described to energize the main contactor MC and start the prime mover P. Otherwise the main switch MS is opened to completely deenergize the system which causes the control relay CR and the slow relay S to drop out.

The foregoing disclosure and the showings made in the drawing are merely illustrative of the principles of this invention and are not to be considered in a limiting sense, the only limitations are to be determined from the scope of the appended claims.

I claim as my invention:

1. In an electric drive for a direct current motor, the combination of, a direct current generator, a series field winding for the generator, circuit means for connecting the generator in series with the direct current motor, an alternating current motor for driving the generator to effect an electrical output thereof, a contactor for energizing the alternating current motor, a resistance element shunting the generator series field winding, means for varying the resistance of the resistance element, a second resistance element shunting the generator series field winding, a movable tap disposed for sliding movement along said second resistance element, and electrically connected to one terminal of the resistance element, an induction motor having starting and running field windings and a rotor connected to drive said movable tap, a pair of alternately operable relays each having normally closed and normally open contacts, cams operated according to movements of the rotor member, a normally closed switch actuated by said cams, a normally open switch actuated by said cams, means for supplying electrical energy, a first circuit connecting said normally open switch and the normally open contacts of one of said pair of relays with said running field winding across said means for supplying electrical energy, a second circuit connecting said normally closed switch and said normally open contacts of the other of said pair of relays with said running field winding across said means for supplying electrical energy, a third circuit including the normally open switch, the normally open contacts of said one relay and the normally closed contacts of said other relay connecting said starting winding in one direction across said means for supplying electrical energy, a fourth circuit including said normally closed switch, the normally open contacts of said other relay and the normally closed contacts of said one relay connecting said starting field winding in a direction reversed from that of said third circuit across said means for supplying electrical energy, and means for selectively energizing said pair of relays.

2. In a series drive, the combination of, a motor having a series field winding, a generator having a series field winding, circuit means connecting the motor and generator in series circuit relation, a resistance element connected in parallel circuit relation with the generator series field winding, an adjustable tap on said resistance element for shunting portions thereof and controlling the amount of current shunted from the generator series field winding, a second resistance element connected in parallel with the generator series field winding and the first mentioned resistance element, a movable tap connected with said second resistance element and being normally disposed to shunt a substantial portion of the second resistance element from the parallel circuit to provide a low resistance shunt for said generator series field winding, an induction motor having a starting field winding and a running field winding, means connecting the rotor of said induction motor to drive said movable tap of said second resistance element, control means for exciting the starting and running field windings of the induction motor, reversing means forming a part of said control means for reversing the excitation of the starting field winding with respect to the running field winding, and switching means responsive to the angular position of said movable tap and operable in conjunction with said reversing means for selectively controlling the application of excitation to said starting and running field windings in dependence of the angular position of said movable tap.

3. In a series drive, the combination of, a motor having a series field winding, a generator having a series field winding, circuit means connecting the motor and generator in series circuit relation, a resistance element connected in parallel circuit relation with the generator series field winding, an adjustable tap on said resistance element for shunting portions thereof and controlling the amount of current shunted from the generator series field winding, a second resistance element connected in parallel with the generator series field winding and the first mentioned resistance element, a movable tap connected with said second resistance element and being normally disposed to shunt a substantial portion of the second resistance element from the parallel circuit to provide a low resistance shunt for said generator series field winding, an induction motor having a starting field winding and a running field winding, means connecting the rotor of said induction motor to drive said movable tap of said second resistance element, control means for exciting the starting and running field windings of the induction motor, reversing means forming a part of said control means for reversing the excitation of the starting field winding with respect to the running field winding, switching means for selectively controlling the application of excitation to the starting and running field windings, and camming means connected to be driven by said induction motor for actuating said switching means, said camming means being indexed with respect to said movable tap to actuate said switching means to cause deenergization of said starting and running field windings in accordance with the limits of movement of said movable tap.

4. In a series drive, the combination of, a motor having a series field winding, a generator having a series field winding, circuit means connecting the motor and generator in series circuit relation, a resistance element connected in parallel circuit relation with the generator series field winding, an adjustable tap on said resistance element for shunting portions thereof and controlling the amount of current shunted from the generator series field winding, a second resistance element connected in parallel with the generator series field winding and the first mentioned resistance element, a movable tap connected with said second resistance element and being normally disposed to shunt a substantial portion of the second resistance element from the parallel circuit to provide a low resistance shunt for said generator series field winding, an induction motor having a starting field winding and a running field winding, means connecting the rotor of said induction motor to drive said movable tap of said second resistance element, a slow relay having a set of normally closed contacts and a set of normally open contacts, a fast relay having a set of normally closed contacts and a set of normally open contacts, means for supplying excitation for the starting and running field windings, circuit means connecting said running field winding with the normally open contacts of said slow relay, circuit means connecting the running field winding with the normally open contacts of the fast relay, circuit means for connecting said starting field winding and the normally closed contacts of said slow relay for one direction of excitation from said means for supplying excitation, circuit means connecting the starting field with the normally closed contacts of said fast relay for a reversed direction of excitation from said means for supplying excitation, a first field switch connecting the normally open contacts of the slow relay with the means for supplying excitation, means responsive to the angular position of said movable tap for opening said first field switch when said movable tap is in a position to shunt substantially all of said second resistance element and for closing said first field switch upon movement of said movable tap from shunting position, a second field switch connecting the normally open contacts of the fast relay with said means for supplying excitation, means responsive to the angular position of said movable tap for maintaining said second field switch closed until said movable tap is in a position wherein substantially none of the second resistance element is shunted, a control relay having a coil, a switch for connecting the coil of said control relay to said means for supplying excitation, means responsive to the angular position of said movable tap for closing said switch when said movable tap is in a position shunting substantially all of said second resistance element and for opening said switch upon movement of said movable tap from shunting position, a set of normally closed contacts on said control relay, a coil for each of the slow and fast relays, a pair of manually operable switches each having a set of normally open contacts and a set of normally closed contacts, circuit means connecting the normally closed contacts of one manually operated switch with the coil of the fast relay and with said means for supplying excitation, circuit means connecting the normally closed contacts of the other manually operated switch with the coil of said slow relay and with said means for supplying excitation, circuit means connecting the manually open contacts of said one manually operable switch in series with the normally closed contacts of said control relay and the coil of said slow relay for connection with said means for supplying excitation, and circuit means connecting the normally open contacts of said other manually operated switch and the coil of said fast relay for connection with said means for supplying excitation.

STANLEY A. BOBE.

REFERENCES CITED

The following references are of record in the file of this patent:

UNITED STATES PATENTS

| Number | Name | Date |
|---|---|---|
| 1,515,205 | Huey | Nov. 11, 1924 |
| 1,734,919 | Scott | Nov. 5, 1929 |
| 2,303,457 | Harding et al. | Dec. 1, 1942 |